United States Patent
Reier et al.

(10) Patent No.: US 9,386,649 B2
(45) Date of Patent: Jul. 5, 2016

(54) METHOD FOR CONTROLLING LIGHT-EMITTING DIODES

(71) Applicant: Lear Corporation, Southfield, MI (US)

(72) Inventors: Michael Reier, Pressig (DE); Klaus-Dieter Grebner, Markt Rodach (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/598,391

(22) Filed: Jan. 16, 2015

(65) Prior Publication Data

US 2015/0216010 A1    Jul. 30, 2015

(30) Foreign Application Priority Data

Jan. 28, 2014 (DE) .......... 10 2014 100 973

(51) Int. Cl.
*H05B 33/08* (2006.01)

(52) U.S. Cl.
CPC ........ *H05B 33/0845* (2013.01); *H05B 33/0827* (2013.01); *Y02B 20/42* (2013.01)

(58) Field of Classification Search
CPC ........... H05B 33/0806; H05B 33/0827; H05B 33/0833; H05B 33/0845
USPC ....................................... 315/76–84
See application file for complete search history.

(56) References Cited

U.S. PATENT DOCUMENTS

| | | | | |
|---|---|---|---|---|
| 6,462,480 B1 * | 10/2002 | Tornare | ........... | B60Q 11/007 315/77 |
| 6,483,205 B1 * | 11/2002 | Martin | ........... | H02M 3/285 307/38 |
| 7,649,326 B2 * | 1/2010 | Johnson | ........... | H05B 33/0818 315/185 R |
| 7,688,002 B2 * | 3/2010 | Ashdown | ........... | H05B 33/0818 315/185 S |
| 8,120,289 B2 | 2/2012 | Vaassen et al. | | |
| 8,164,276 B2 | 4/2012 | Kuwabara | | |
| 8,664,869 B2 | 3/2014 | Grebner et al. | | |
| 2008/0203946 A1 | 8/2008 | Ito et al. | | |
| 2009/0251065 A1 | 10/2009 | Niedermeier et al. | | |
| 2010/0013411 A1 | 1/2010 | Krespach et al. | | |
| 2010/0109557 A1 * | 5/2010 | Bouchard | ........... | H05B 33/0818 315/294 |
| 2010/0308739 A1 * | 12/2010 | Shteynberg | ........... | H05B 33/083 315/193 |
| 2011/0068702 A1 | 3/2011 | van de Ven et al. | | |
| 2011/0248640 A1 * | 10/2011 | Welten | ........... | H05B 33/083 315/210 |
| 2014/0001955 A1 * | 1/2014 | Bouffay | ........... | H05B 33/0818 315/82 |
| 2014/0042919 A1 * | 2/2014 | Yang | ........... | H05B 33/0839 315/186 |

FOREIGN PATENT DOCUMENTS

DE    202007011973 U1    1/2009

* cited by examiner

*Primary Examiner* — Jason M Crawford
*Assistant Examiner* — Kurtis R Bahr
(74) *Attorney, Agent, or Firm* — MacMillan, Sobanski & Todd, LLC (57) ABSTRACT

The brightness generated by LEDs in an LED strip is adjusted by pulse-width modulation, wherein the LEDs connected in series are driven temporally offset to one another. If there is a shift in the on-time of at least one LED, a controller inserts at least one additional drive pulse to switch on the LEDs if the interval of the on-times of an LED in the time frame before the shift and in the drive frame after the shift is so large that the interval arising therefrom exceeds a first threshold. Alternatively, the controller reduces at least one drive pulse for switching on the LEDs to curtail the on-time of the LEDs if the interval of the on-times of an LED in the time frame before the shift and in the time frame after the shift is so small that the interval arising therefrom drops below a second threshold.

9 Claims, 5 Drawing Sheets

METHOD FOR CONTROLLING LIGHT-EMITTING DIODES

CROSS-REFERENCE TO RELATED APPLICATIONS

This application claims priority to German Application No. 10 2014 100 973.8 filed Jan. 28, 2014, the disclosure of which is incorporated herein by reference.

BACKGROUND OF THE INVENTION

The present invention relates to a method for controlling at least one LED strip comprising a multiplicity of light-emitting diodes (LEDs) connected in series, wherein each of the LEDs is separately connected by a switching element and a controller connects the switching elements for connecting the LEDs by outputting drive pulses. The brightness generated by the LEDs is adjusted by means of pulse-width modulation (PWM) by changing the ON period of an LED within a drive frame, wherein the LEDs connected in series are driven temporally offset to one another. Such LED strips are used among other things for external illumination in headlights for automobiles and for signaling purposes (e.g., as a brake light).

Driving devices currently use pulse-pause modulation to vary the brightness of different LEDs which are connected in series. To this end, a switch arranged in parallel to the LED conducts a constant flowing current in the off-time, in which the LEDs do not output any light. To this end, in relation to a so-called matrix arrangement of LEDs, it is possible to operate all LEDs connected in series at their maximum illumination.

Furthermore, all LEDs of a so-called LED strip (LEDs connected in series) are driven temporally offset so that the chain-length or strip-length of the driven LEDs remains as constant as possible and the forward voltage is thereby subjected to a fluctuation as small as possible. This results in a kind of "block control" for an LED strip.

If the on-time of an LED now changes, all of the on-times of the LEDs driven in the block (or strip) will shift. Within one clock pulse (drive frame), which has a temporal length of 5 ms for example, the LEDs are often driven only for a specific duration within the clock pulse. In normal operation, certain intervals thereby arise between the states in which the LEDs are connected luminous. If, for example, an LED is connected for 2 ms at the start of a clock pulse (drive frame) which has a temporal length of 5 ms, then a time period of 3 ms will pass until this LED is again connected at the start of the next clock pulse (drive frame).

In the change of on-time given above, at least one LED will nevertheless experience a discontinuous shift in on-time from other LEDs at the time of the change, which, in an extreme case, will in turn result in a gap or a double drive. In the example given above, a shift of the on-time and therefore of the drive pulse, by 3 ms for example, would mean that prior to the change the LED is normally connected within the clock pulse (drive frame) at the start of the clock pulse (drive frame), and that, after the change of the on-time (shift), the LED is connected within the clock pulse for 2 ms only at the end of this clock pulse (drive frame), wherein the LED would thus be disconnected for 6 ms, thereby resulting in a visible (light) gap. But there can also occur a shift in which the LED is connected for 2 ms at the end of the clock pulse (drive frame) before the shift (change) and connected for 2 ms at the start of the next clock pulse (drive frame) after the shift, thereby resulting in a total ON period of 4 ms (double drive).

Such an effect arises in particular at the moment that the on-time of an LED is changed, wherein after this change, i.e. after the shifting of the on-times of the LEDs, they are again operated with the same temporal intervals. But during the change of the on-time, the human eye can perceive this as flickering. By means of frequency analysis, it can be determined that the gap or double drive results in a spectrum which exhibits frequencies in the range under 100 Hz and corresponding amplitudes.

This flickering is disturbing however and, in the case of headlights of motor vehicles for example, can disturb other traffic participants.

SUMMARY OF THE INVENTION

It is therefore the object of the present invention to provide a method for controlling at least one LED strip, wherein disturbing effects, e.g. flickering, are avoided at the moment when an on-time of one or a plurality of LEDs is changed.

According to the invention, the object is achieved by a method having the features cited in claim 1. Advantageous further developments of the invention are cited in detail in the dependent claims.

In a method according to the invention for controlling at least one LED strip comprising a multiplicity of LEDs connected in series, wherein each of the LEDs is separately connected by a switching element and to connect the LEDs a controller connects the switching elements by outputting drive pulses, and the brightness generated by the LEDs is adjusted by means of pulse-width modulation by changing the ON period of an LED within a drive frame, and the LEDs connected in series are driven temporally offset to one another, in the event of a shift in the on-time of at least one LED the controller inserts at least one additional drive pulse to switch on the LEDs if the interval of the on-times of an LED in the time frame before the shift and in the drive frame after the shift is so large that the interval arising therefrom exceeds a first threshold, and/or the controller reduces at least one drive pulse for connecting the LEDs to curtail the on-time of the LEDs if the interval of the on-times of an LED in the time frame before the shift and in the time frame after the shift is so small that the interval arising therefrom drops below a second threshold.

Reducing a drive pulse means that the temporal length of the drive pulse is reduced/curtailed so that the corresponding LED features a curtailed ON period. Additional drive pulses cause the LEDs to be connected for the duration of the temporal length of the additional drive pulses in addition to the time in which they are connected light-emitting ("luminous") by the "normal" drive pulses in order to emit light. If in the event of the change of one on-time, a shift by a specific temporal length for example, there likewise occurs a shifting of the on-times of other LEDs, wherein, for example, a particular LED is switched on for a specific temporal length at the start of a drive frame before this change and this LED is switched on at the end of the drive frame in a subsequent drive frame after the change, then a visible "flickering" would appear due to the gap arising therefrom, although the insertion of an additional drive pulse prevents this. The additional drive pulse connects the LED for a specific duration, for example, at the end of the last drive frame before the change or, for example, at the start of the drive frame after the change, so that the brightness outputted by the LED remains essentially constant without the occurrence of a longer off-time. The drive pulses can accordingly be curtailed to a certain extent before the change or after the change if, for example, two drive pulses of two sequential drive frames have a very short temporal interval between one another or even succeed one another directly. This would lead to a longer on-time of the light-emitting diodes, meaning an excessive brightness due to the longer ON period. The curtailment of at least one drive pulse limits the ON period of the LED to a certain extent so that no visible flickering appears.

The method is suitable for example for controlling LED strips that are used in motor vehicles (for example, headlights, taillights, brake lights, blinkers, etc.). In addition, a plurality of LED strips which belong to one luminous means can each be operated with the method explained above, wherein the controller for each LED strip carries out an appropriate control.

Moreover, the switching elements can be transistors, which conduct the current parallel to the LEDs in the off-time of the LEDs.

The temporal length of the additional drive pulse and/or the curtailment of the drive pulse can be determined by a moving average of the brightness of the LEDs. To this end, the controller determines how long the corresponding LEDs have to be switched on (by an additional drive pulse or by curtailing the drive pulse) as a function of the detected brightness outputted by the LED strip or by the averaged brightness of the LEDs over a specific number of drive frames so that a homogenous transition for the other LEDs in relation to the brightness is provided in the event of a change of the on-time of one LED.

The shift of the on-times of the other LEDs of an LED strip when the on-time of one or a plurality of LEDs changes is stored in the controller or determined in the controller before the time of the change (shift) so that it can already output appropriate drive pulses (curtailed drive pulses or additional drive pulses) before the change.

The temporal length of the additional drive pulses and/or the curtailment of the drive pulses can be calculated as a function of the shift of the on-times. For example a fixed algorithm, which detects or determines appropriate drive pulses (curtailed drive pulses and/or additional drive pulses) as a function of the duration of the on-time and the size of the shift or temporal length of the drive frame, can be provided for this.

The temporal length of the additional drive pulse and/or the curtailment of a drive pulse can be determined by means of a look-up table, wherein appropriate curtailed drive pulses and/or additional drive pulses are stored for a multiplicity of intervals between the on-time in the drive frame before a shift and the on-time in the drive frame after a shift. Based on the calculated shift, the controller can here access drive pulses (curtailed drive pulses and/or additional drive pulses) appropriately timed to the shift.

A shift of the on-times can also be executed over a plurality of drive frames, wherein in each time frame the controller can output at least one additional drive pulse and/or a reduced drive pulse for driving the LEDs. The controller can also execute the shift of the on-time of one LED that entails a shift of the on-times of the other LEDs of an LED strip in such a manner that the ON period, for example, is implemented only incrementally in relation to the temporal length of a drive frame. To prevent the other LEDs from experiencing gaps or double driving or short intervals between two drive pulses, additional drive pulses and/or reduced drive pulses are outputted for the respective LEDs, wherein a curtailment or an additional drive pulse has a smaller temporal length than, for example, an additional drive pulse which compensates for a gap between two drive frames.

The controller can determine the maximum shift of the on-times as a function of the temporal length of the drive frame and/or the on-time length of the LEDs. To this end, it is determined to what extent a shift of the on-times may take place without the controller outputting additional drive pulses or curtailed drive pulses. Moreover, the first and the second threshold which the insertion of at least one additional drive pulse and/or the curtailment of at least one drive pulse bring about are to be determined in correspondence with the temporal length of the drive frame and the on-time period of the LED. If an LED is switched on for 50% of the temporal length of a drive frame, for example, wherein there occurs a shift of the on-time by less than 10% of the temporal length of the drive frame for example, then the insertion of additional drive pulses and/or the curtailment of drive pulses cannot be required.

An additional drive pulse can be required if the temporal shift of the on-time leads to a gap larger than 10% of the temporal length of the drive frame, for example. Here, the maximum permissible temporal shift of the on-time must always be considered a function of the temporal length of the drive frame, the on-time period of the LED, and the temporal length of the shift.

A curtailment of the drive pulse can be required if the temporal shift of the on-time leads to a double drive larger than 10% of the temporal length of the drive frame, for example. For temporal shifts of the on-time which are smaller than 10% of the temporal length of the drive frame, for example, depending on the temporal length of the drive frame and the on-time period of the LED, there result little to no effects that the human eye can be perceive as flickering.

The drive frame can have a temporal length between 3 ms and 5 ms, for example. But the method can also be used for other temporal lengths of the drive frame.

Other advantages, features, and embodiments will emerge from the following description of the figures in relation to the associated drawings.

DETAILED DESCRIPTION OF THE PREFERRED EMBODIMENTS

In the figures, elements provided with the same reference characters essentially correspond to each other unless stated otherwise. Circuits and method sequences which are not required to understand the method explained below have not been illustrated.

Figure 1:
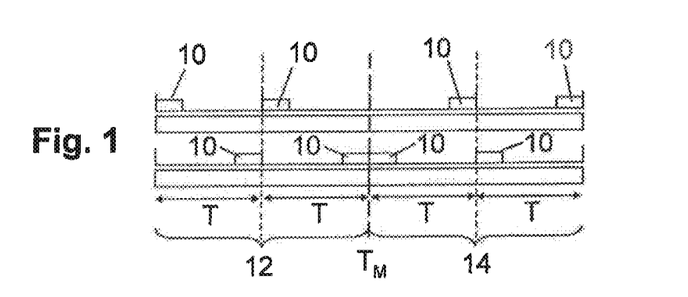
FIG. 1 is a schematic diagram of a shift of drive pulses.

FIG. 1 depicts a schematic diagram of a shift of drive pulses 10, wherein a corresponding controller undertakes no measures to eliminate the disadvantages arising therefrom.

FIG. 1 illustrates four sequential drive frames each of which has a period, i.e., a temporal length T. The temporal length T amounts to 5 ms, for example. At time $T_M$, there occurs a change wherein the drive pulse for one LED is shifted, which likewise leads to a shift of the drive pulse 10 in time period 14 after the time of the change $T_M$. FIG. 1 illustrates two different examples, wherein in the top drawing a drive pulse 10 is outputted for a specific temporal length at the start of the each drive frame in time period 12 before the time of the change $T_M$, and wherein the corresponding LED therefore emits light for this time period. After time $T_M$ in time period 14, the drive pulse 10 was shifted to the end of the drive frame due to the shift of the on-time of one or a plurality of other LEDs.

In the lower example of FIG. 1, in time period 12 a drive pulse 10 for an LED is outputted at the end of each drive frame, the associated LED therefore emitting light. The shifting of the on-time of one or a plurality of LEDs at time $T_M$ likewise results in a shift of the drive pulse 10, wherein in time period 14 the drive pulse 10 is outputted at the start of the each drive frame.

Figure 2:
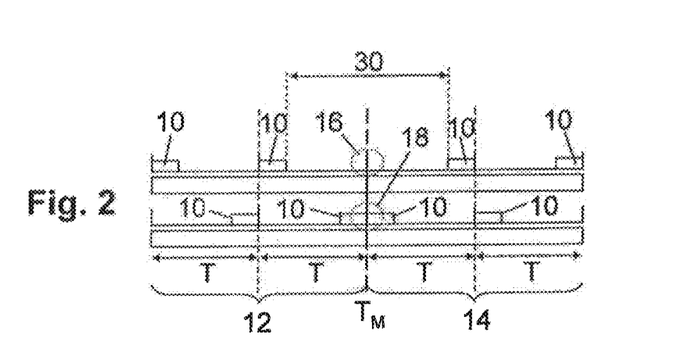
FIG. 2 is another schematic diagram of a shift of drive pulses.

FIG. 2 depicts another schematic diagram of a shift of drive pulses 10, wherein the diagram essentially corresponds to the diagram of FIG. 1. As evident in FIG. 2, however, a shift of the drive pulses 10 arises at time $T_M$ or at the corresponding time period so that there occurs a gap 16 in the top example and a double drive 18 in the bottom example. In the top example, the interval 30 between two sequential drive pulses 10 is so large that flickering, for example, of a headlight of a motor vehicle, which has an LED strip with a multiplicity of LEDs, can occur. The same problem appears if the shift of the on-time of one or a plurality of LEDs of the LED strip likewise results in a shift of the LED which is connected by the drive pulses 10. In the bottom example, there occurs a double drive 18, wherein an LED therefore emits light over a longer time period than required to provide a specific brightness.

The shifts of the drive pulses 10 from time period 12 to time period 14 depicted in FIGS. 1 and 2 are extreme examples, but it is nevertheless evident that, due to larger intervals between the drive pulses 10 or due to smaller intervals between the drive pulses 10 at the moment of change, a spectrum can arise in which there occur frequencies in the range under 100 Hz and corresponding amplitudes so that the human eye can recognize this effect as flickering.

To compensate for or prevent the brightness variations arising therefrom, it is proposed that additional drive pulses or curtailed drive pulses be outputted, as illustrated in FIGS. 3 to 6.

Figure 3A:
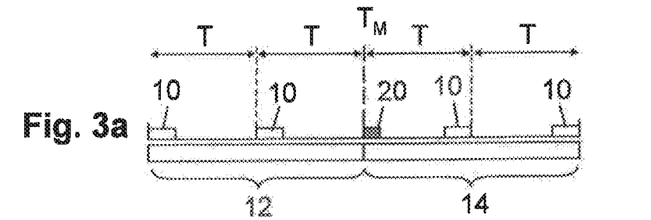
FIGS. 3a, 3b, and 3c are schematic diagrams of a shift of drive pulses with an additional drive pulse.
Figure 3B:
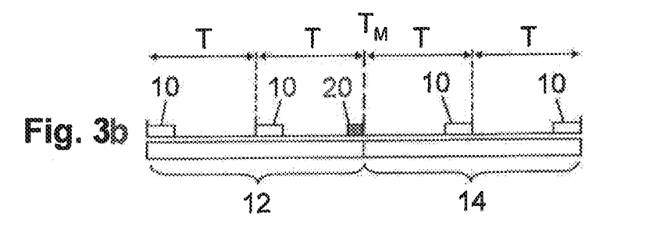
Figure 3C:
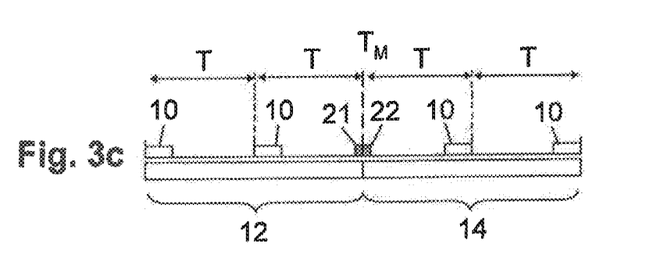

FIGS. 3a to 3c illustrate a schematic diagram of a shift of drive pulses 10 respectively having an additional drive pulse 20, 21, or 22. Four sequential drive frames are illustrated in correspondence with the diagram depicted in FIGS. 1 and 2. These demonstrate a temporal length T. After a time period 12, there occurs a change at time $T_M$, wherein there arises a shifting of the drive pulses 10 in time period 14 after the change.

The shift illustrated in FIGS. 3a to 3c arises for example in an LED strip which has a multiplicity of LEDs connected in series, wherein each of the LEDs is separately controlled by a switching element and a controller connects the switching elements for connecting the LEDs by outputting the drive pulses 10. The brightness generated by the LEDs is adjusted by means of pulse-width modulation by changing the ON period of an LED within a drive frame and the LEDs connected in series are driven temporally offset to one another to keep the chain length of the driven LEDs as constant as possible and thereby subject the forward voltage to as small a fluctuation as possible. In the driving process, the current is conducted through the LEDs to switch on or luminesce the LEDs and, in the off-times in which the LEDs do not luminesce, i.e., do not emit light, it is conducted through the switching elements parallel to the LEDs. In particular, the switching elements can be transistors. Along with other LED strips, the LED strip can belong to a luminous means of a motor vehicle, such as a front light unit or a rear light unit, for example.

As depicted in FIG. 3a, the drive pulses 10 have a temporal length which is smaller than the temporal length T of the drive frame. If the ON period of one LED strip is changed or shifted at a time $T_M$, there arises a shift in the other LEDs or in the ON period of the other LEDs due to the temporally offset drive of all LEDs of the LED strip. For the drive pulse 10 exemplarily depicted in FIG. 3a for one LED, this leads to a shifting of the drive pulse 10 from the start of the drive frame to the end of the drive frame. As already described for FIGS. 1 and 2, a gap thereby arises, i.e., there comes about a temporal length of the off-time of the LED between two drive pulses which is substantially larger than the normal interval of the on-times of the LED. It is possible to tolerate a shift up to a specific threshold, wherein in the example depicted in FIG. 3a, however, the shift is so large that a flickering of a headlight would appear at the moment of change (shifting of the on-times of the LEDs). To prevent this, the controller, which carries out the shift of the on-times and the driving of the LEDs and which knows the respective on-times and on-states, inserts an additional drive pulse 20 at the start of the first drive frame after the time $T_M$ of the change. The temporal length of the additional drive pulse 20 depends on the temporal interval between two drive pulses 10 (temporal length of the off-time of the LED) and the temporal length of the drive frame and the temporal length of the drive pulse 10.

A moving average of the outputted brightness of the LEDs over a specific number of drive frames can be carried out to determine the temporal length of the additional drive pulse 20. It is moreover possible to provide the controller with a fixed algorithm which, as a function of the temporal lengths of the drive pulse 10, the drive frame and the interval between two on-times of the LED, determines what additional drive pulses 20 (or 21 and 22) will be outputted. To this end, it is also possible to access a so-called look-up table, wherein appropriate additional drive pulses 20, 21, and 22 are stored for a multiplicity of intervals between the on-time in the drive frame before a shift and the on-time in the drive frame after a shift.

In the example illustrated in FIG. 3b, the additional drive pulse 20 is inserted at the end of the last drive frame before the time $T_M$ of the change. Two additional drive pulses 21 and 22 are inserted in the example illustrated in FIG. 3c, wherein an additional drive pulse 21 is inserted at the end of the drive frame before the time $T_M$ of the change and an additional drive pulse 22 is inserted at the start of the drive frame after the time $T_M$ of the change. The lengths of the two additional inserted drive pulses 21 and 22 each correspond for example to half of the length of the additional drive pulses 20 of FIGS. 3a and 3b. The division of the two additional drive pulses 21 and 22 can occur unequally, however, i.e., that the temporal length of the additional drive pulse 21 is greater than the temporal length of the additional drive pulse 22 for example or vice-versa.

Figure 4A:
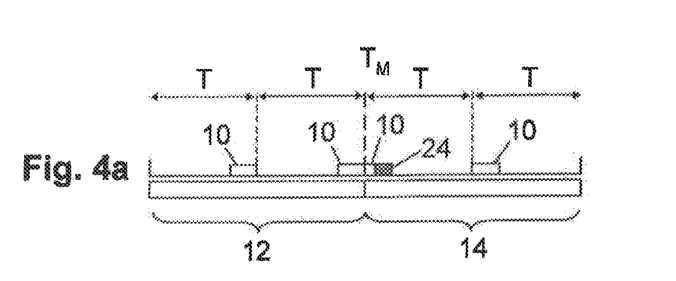
FIGS. 4a, 4b, and 4c are schematic diagrams of a shift of drive pulses with a curtailed drive pulse.

FIG. 4a depicts a schematic diagram of a shift of drive pulses 10 with curtailed drive pulses 10. As already explained in reference to FIGS. 1 and 2, in the shifting of the on-times of one or a plurality of LEDs of an LED strip, there occurs a shift of the on-time of one LED, illustrated by the drive pulses 10. In an extreme case, two drive pulses 10 are outputted directly behind one another in the drive frame before the time of the change $T_M$ and the drive frame after the time of the change $T_M$. The temporal length or duration in which the LED emits light is thereby considerably longer than regularly specified by the temporal length of the drive pulse 10. In an LED strip having a multiplicity of LEDs, flickering would appear at the moment of change $T_M$ since this LED would luminesce twice as long. To prevent flickering, the controller carries out a curtailment 24 of the drive pulse 10 in the first drive frame after the time $T_M$ of the change. The temporal length or duration of the on-time of this LED is indeed larger than regularly specified by a single drive frame 10, wherein this drawing is only exemplary for the curtailment. Nevertheless, this kind of curtailment 24 for the drive pulse 10 can also permit a longer on-time of the LED relative to a single drive pulse 10, so that the interval of the on-times of this LED due to the drive pulses 10 does thereby not become so large that it exceeds a first threshold, which lies in the range of the visual threshold of perceptibility (typically in the range of approximately 10% of the length of the drive frame). It should not happen, for example, that no drive pulse 10 is outputted within a drive frame.

The determination of the curtailment 24 of the drive pulse 10 can occur as already described for FIGS. 3a to 3c. To this end, an algorithm, a look-up table, and a moving average of the brightness of the LEDs can be used for example.

Figure 4B:
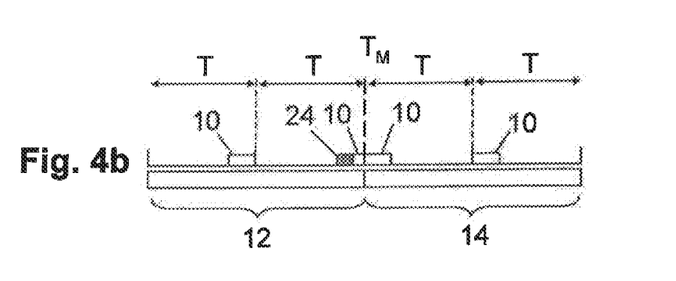

In the example illustrated in FIG. 4b, there occurs a curtailment 24 in the last drive frame before the time $T_M$ of the change.

Figure 4C:
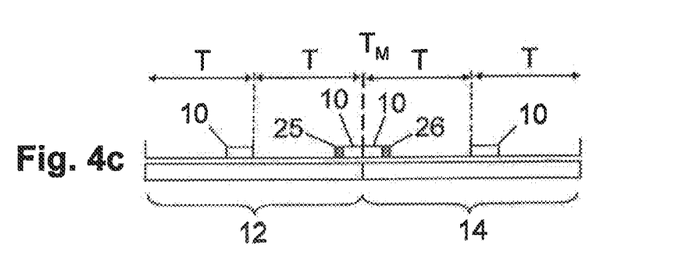

In the example illustrated in FIG. 4c, there occurs a curtailment 25 of the drive pulse 10 both in the last frame before the time $T_M$ of the change, as well as a curtailment 26 of the drive pulse 10 in the first frame after the time $T_M$ of the change. The curtailment 24, 25, 26 and the outputting of additional drive pulses 20, 21, and 22 always takes place as a function of the temporal length of the drive frame, the temporal length of the drive pulses, and the interval of two adjacent drive pulses 10. In the method described here, certain shifts can be tolerated without introducing additional drive pulses 20, 21, 22 or curtailments 24, 25, 26 if no differences in brightness that can be perceived by the human eye arise during the shifting of the on-times of the LEDs at the moment of change at time $T_M$. To this end, the controller determines on the basis of present control signals and drive pulses what shifting will occur and then determines for example whether the shifting will bring about so-called gaps or double drives which have a spectrum that demonstrates frequencies under 100 Hz for example with corresponding amplitudes. But these specifications are changeably stored in the controller so that an adjustment can occur.

Moreover, by means of a look-up table which is stored in a memory, it is possible to specify at what intervals what drive pulses will be outputted.

Figure 5A:
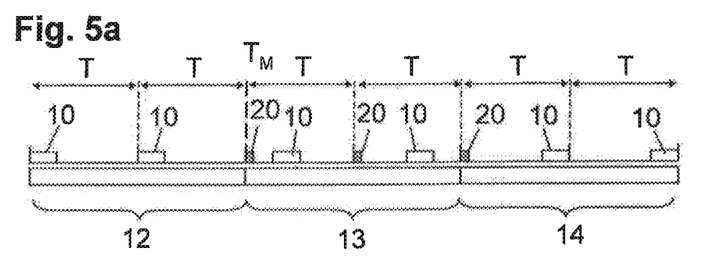
FIGS. 5a, 5b, and 5c are schematic diagrams of a shift of drive pulses with a plurality of additional drive pulses
Figure 5B:
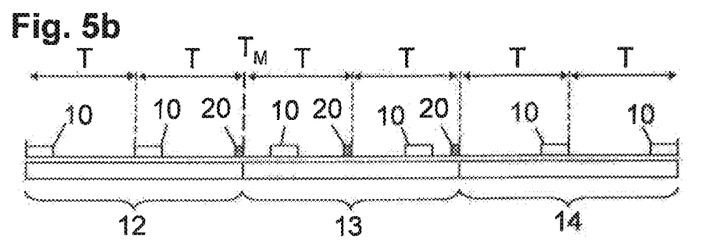
Figure 5C:
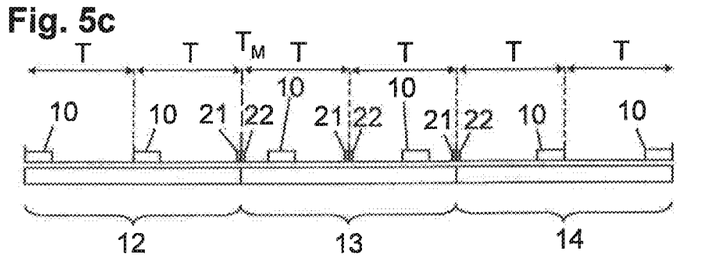

FIG. 5a depicts a schematic drawing of a shift of drive pulses 10 with a plurality of additional drive pulses 20. As already explained above in reference to FIGS. 1 to 4, there occurs a change in the on-time of at least one LED of an LED strip at time $T_M$, wherein there results a shift of the on-times of the other LEDs which are driven temporally offset to one another. By way of example, FIGS. 5a to 5c depict the shift of the on-time of one LED. In time period 12 before the time $T_M$ of the change, one drive pulse 10 is outputted in each of the two drive frames at the start of the drive frame. The controller then controls the shifting of the drive pulse 10 to operate this LED in such a manner that the shifting takes place over two drive frames (time period 13), wherein one drive pulse 20 is outputted for each of the two drive frames in time period 13 and in the first drive frame of time frame 14, and this drive pulse has significantly smaller temporal lengths than the additional drive pulses of FIGS. 3 and 4, which are outputted in the case of a discontinuous shift of a drive pulse 10 from the start of a drive frame to the end of a following drive frame. The additional drive pulses 20 in the time period 13 and in the first drive frame of the time period 14 change the thereby outputted brightness of this LED only slightly, wherein appropriate bounds can be specified for this. In the example depicted in FIG. 5a, additional drive pulses 20 are respectively inserted at the start of the drive frame.

In the example depicted in FIG. 5b, in contrast, an additional drive pulse 20 is inserted at the end of each drive frame of time period 13 and also at the end of the drive frame before the time $T_M$ of the change.

In the example depicted in FIG. 5c, the controller inserts additional drive pulses 21 and 22, wherein there are inserted an additional drive pulse 21 at the end of the drive frame before the time $T_M$ of the change, an additional drive pulse 22 at the start of the drive frame after the time $T_M$ of the change and additionally, an additional drive pulse 21 at the end of this drive frame. In the immediately subsequent drive frame, there are again inserted an additional drive pulse 22 at the start of the drive frame and an additional drive pulse 21 at the end of this drive frame. Beyond that, an additional drive pulse 22 is inserted in the first drive frame of time period 14 at the start of this drive frame.

Figure 6A:
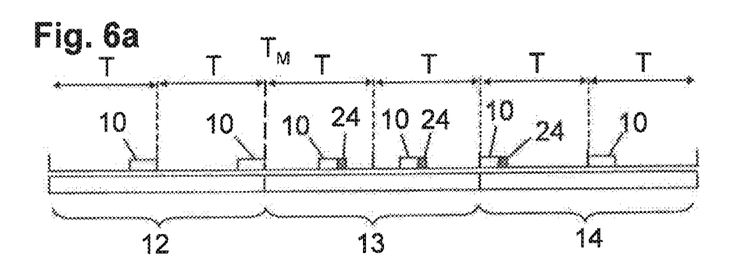
FIGS. 6a, 6b, and 6c are schematic diagrams of a shift of drive pulses with a plurality of curtailed drive pulses.
Figure 6B:
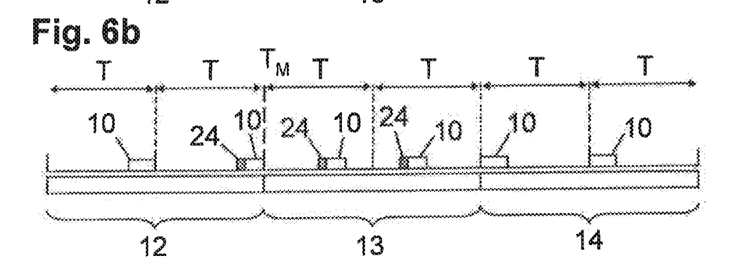
Figure 6C:
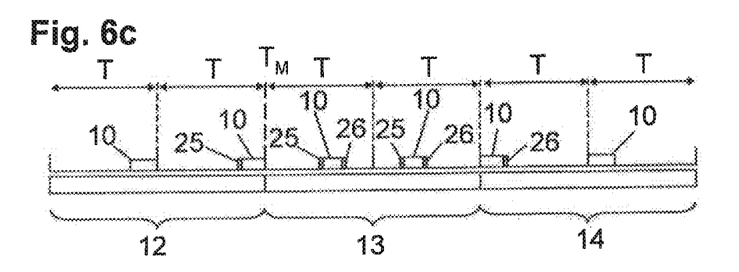

Analogously to the examples depicted in FIGS. 5a to 5c, wherein additional drive pulses 20, 21, 22 were inserted for a shift of the on-time of an LED, FIGS. 6a, 6b, and 6c depict a curtailment 24, 25, and 26 of drive pulses 10 in the event of the shifting of the on-time of an LED. To this end, the shifting of the on-time by the drive pulses 10 required for this takes place over two drive frames in time period 13. For the example depicted in FIG. 6a, a curtailment 24 of the drive pulses 10 occurs in time period 13 and in the first drive frame in time period 14, wherein in time period 13 the drive pulses 10 are each shifted only by a specific specifiable temporal length, which is determined by the controller. In the example depicted in FIG. 6a, the curtailment 24 occurs at the end of the drive pulse, i.e., the drive pulse 10 incrementally shifts the start of the drive of the LED for the luminescence and the duration of the drive pulse 10 is curtailed. In the example depicted in FIG. 6b, a curtailment 24 occurs at the start of the drive pulse 10, wherein here, besides the shift of the drive pulse 10 in the time frame 13 by a specific temporal length specifiable by the controller, there occurs an additional shift by the temporal length of the curtailment 24.

In the example depicted in FIG. 6c, a curtailment 25 of the drive pulse 10 occurs at the start of the drive pulse 10 in the last drive frame before the time $T_M$ of the change, wherein the on-time in the last drive frame before the time $T_M$ is both curtailed and shifted by a specific temporal length. In the first drive frame of time period 13, there occurs a curtailment 25 of the drive pulse 10, which causes a shift of the drive pulse 10 in addition to the shift of the drive pulse 10 carried out by the controller. Moreover, another curtailment 26 at the end of the drive pulse 10 occurs in the first drive frame of the time period 13, thereby leading to another curtailment of the temporal length of the drive pulse 10. In the second drive frame of time period 13, there occurs another shift of the drive pulse 10 by the controller, wherein an additional shift and curtailment of the drive pulse 10 are implemented by the curtailment 25, and there occurs another curtailment of the drive pulse 10 by the curtailment 26. Another curtailment of the drive pulse 10 occurs in the first drive frame of the time period 14. Due to the implemented curtailments 25 and 26, there also results on the basis of an averaged brightness (over at least four drive frames before the time $T_M$ of the change for example) a brightness that also remains essentially equal in the drive frames of the time periods 13 and 14.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A method for controlling at least one LED strip including a multiplicity of LEDs connected in series, wherein each of the LEDs is separately connected by a switching element and a controller connects the switching elements for connecting the LEDs by outputting drive pulses, wherein the brightness generated by the LEDs is adjusted by means of pulse-width modulation by changing the ON period of an LED within a drive frame, and the LEDs connected in series are driven temporally offset to one another, the method comprising the steps of:

in the event of a shift in the on-time of at least one LED, the controller inserts at least one additional drive pulse to switch on the LEDs if the interval of the on-times of an LED in the time frame before the shift and in the drive frame after the shift is so large that the interval arising therefrom exceeds a first threshold, and/or the controller reduces at least one drive pulse for switching on the LEDs to curtail the on-time of the LEDs if the interval of the on-times of an LED in the time frame before the shift and in the time frame after the shift is so small that the interval arising therefrom drops below a second threshold.

2. The method defined in claim 1, wherein the temporal length of the additional drive pulses and/or the curtailment of the drive pulses is determined by a moving average of the brightness of the LEDs.

3. The method defined in claim 1, wherein the temporal length of the additional drive pulses and/or the curtailment of the drive pulses are calculated as a function of the shift of the on-times.

4. The method defined in claim 1, wherein the lateral length of the additional drive pulses and/or the curtailment of the drive pulses are determined by means of a look-up table, wherein appropriate curtailed drive pulses and/or additional drive pulses are stored for a multiplicity of intervals between the on-time in the drive frame before a shift and the on-time in the drive frame after a shift.

5. The method defined in claim 1, wherein a shift of the on-times is executed over a plurality of drive frames and, in each time frame, the controller outputs at least one additional drive pulse and/or a reduced drive pulse for driving the LEDs.

6. The method defined in claim 5, wherein the controller determines a maximum shift of the on-times as a function of the temporal length of the drive frame and/or the on-time length of the LEDs.

7. The method defined in claim 1, wherein an additional drive pulse is inserted if the temporal shift of the on-time is greater than a threshold of the temporal length of the drive frame that is determined as a function of visual perceptibility.

8. The method defined in claim 1, wherein a curtailment of the drive pulse is executed if the temporal shift of the on-time is greater than a threshold of the temporal length of the drive frame that is determined as a function of a visual perceptibility.

9. The method defined in claim 1, wherein the drive frame has a temporal length between 2 ms and 5 ms.

* * * * *